(12) United States Patent
Guion et al.

(10) Patent No.: US 6,896,189 B2
(45) Date of Patent: May 24, 2005

(54) CARD COMPRISING ELECTRICAL CONTACTS

(75) Inventors: Christian Guion, Verrières le Buisson (FR); Etienne Catte, Sèvres (FR)

(73) Assignee: Axalto SA, Montrouge (FR)

( * ) Notice: Subject to any disclaimer, the term of this patent is extended or adjusted under 35 U.S.C. 154(b) by 0 days.

(21) Appl. No.: 10/149,132

(22) PCT Filed: May 2, 2001

(86) PCT No.: PCT/IB01/00739

§ 371 (c)(1),
(2), (4) Date: Feb. 13, 2003

(87) PCT Pub. No.: WO01/84493

PCT Pub. Date: Nov. 8, 2001

(65) Prior Publication Data

US 2003/0155424 A1 Aug. 21, 2003

(Under 37 CFR 1.47)

(30) Foreign Application Priority Data

May 3, 2000 (FR) .............................................. 0005621

(51) Int. Cl.[7] .............................................. G06K 19/06
(52) U.S. Cl. ..................................... 235/492; 235/451
(58) Field of Search ................................ 235/492, 451, 235/7

(56) References Cited

U.S. PATENT DOCUMENTS

| | | | | | |
|---|---|---|---|---|---|
| 4,860,087 A | * | 8/1989 | Matsubara et al. | ......... | 257/786 |
| 5,086,216 A | * | 2/1992 | Mollet et al. | ................ | 235/492 |
| 5,091,618 A | * | 2/1992 | Takahashi | ..................... | 235/441 |
| 5,126,548 A | * | 6/1992 | Sekiguchi | ..................... | 235/492 |
| 5,434,395 A | * | 7/1995 | Storck et al. | ................ | 235/380 |
| 5,932,866 A | * | 8/1999 | Terada et al. | ................ | 235/487 |
| 6,002,605 A | * | 12/1999 | Iwasaki et al. | ................ | 365/51 |
| 6,145,035 A | * | 11/2000 | Mai et al. | ...................... | 710/62 |
| 6,151,647 A | * | 11/2000 | Sarat | .......................... | 710/301 |
| 6,343,364 B1 | * | 1/2002 | Leydier et al. | ............. | 713/500 |
| 6,402,032 B1 | * | 6/2002 | Huang et al. | ............... | 235/441 |
| 6,439,464 B1 | * | 8/2002 | Fruhauf et al. | ............. | 235/492 |
| 6,543,690 B2 | * | 4/2003 | Leydier et al. | ............. | 235/451 |
| 6,572,015 B1 | * | 6/2003 | Norton | ....................... | 235/382 |
| 6,581,122 B1 | * | 6/2003 | Sarat | .......................... | 710/301 |
| 6,641,050 B2 | * | 11/2003 | Kelley et al. | ................ | 235/492 |
| 6,694,399 B1 | * | 2/2004 | Leydier et al. | ............. | 710/301 |

* cited by examiner

Primary Examiner—Daniel Stcyr
Assistant Examiner—Kimberly D. Nguyen
(74) Attorney, Agent, or Firm—Pehr Jansson

(57) ABSTRACT

A card comprises electrical contacts (32, 34) for communicating data in the form of a differential accordance with a universal serial bus (USB) standard. The card can be inserted in a card reader having complementary electrical contacts (16). The card has an insertion edge (A) which traverses the complementary electrical contacts when the card is inserted in the card reader in a correct fashion. The card comprises an electrical contact for receiving a power supply voltage which (22) electrical contact (22) is closer to the insertion edge than either electrical contact of the pair of electrical contacts (32, 34) for communicating data in the form a differential signal in accordance the USB standard.

2 Claims, 2 Drawing Sheets

CARD COMPRISING ELECTRICAL CONTACTS

FIELD OF THE INVENTION

The present invention relates to a card comprising electrical contacts for communicating in accordance with a universal serial bus (USB) standard, for example, the USB standard version 1.1 of Sep. 23, 1998. Such a card can be inserted in a card reader having complementary electrical contacts. The card reader may be part of, for example, a microcomputer.

BACKGROUND OF THE INVENTION

The French patent application published under number 2 783 336 describes a card comprising electrical contacts for communicating in accordance with a universal serial bus (USB) standard. The card has external electrical contact areas compatible not only with ISO standard 7816 which defines standard cards, but also with USB standard version 1.1 of Sep. 23, 1998.

A problem encountered is described below with reference to accompanying FIGS. 1 and 2.

FIG. 1 shows part of a card body 10 made of plastics material and having an electronics module 12 received therein represented by its external contact areas 14 for providing electrical connections between the integrated circuit of the electronics module 12 and contact elements of the connector 16 shown in FIG. 2. As a general rule, the various contacts are constituted by a single conductive coating made on the contact face of the module and etched so as to define different external areas. With a standard module, there is a first area 18 that constitutes the ground contact and that generally extends into a central zone 20 of the face of the electronics module, a VCC area 22 for supplying electrical power to the electronics module, a VPP area 24 for applying a write voltage for the memories of the electronics module, an RST area 26 for resetting auxiliary circuits of the electronics module to zero, an area 28 for receiving a clock signal CLK, and an I/O area 30 for inputting and outputting data interchanged between the electronics module of the card and the card reader. Two areas 32 and 34 remain available. For a card that complies simultaneously both with ISO standard 7816 and with the USB standard, the external areas 32 and 34, conventionally referred to as D+ and D−, serve as serial data inputs for providing a higher rate of information interchange between the card and the reader. The areas 18 to 34 are distributed in two rows that extend perpendicularly to the direction in which the card is inserted into the reader.

FIG. 2 shows the connector 16 of the card reader which essentially comprises a frame 36 having two parallel series of resilient contacts 38 and 40 fixed thereon for coming into electrical contact with respective ones of the external areas. The various resilient contacts 38 and 40 are connected to a processor circuit 42 of the reader. In FIG. 2, arrow F shows the direction in which the card C is inserted into the reader, and the term "insertion edge" is used to designate the edge A of the card body 10 adjacent to which the electronics module 12 is located.

It will be understood that given the geometrical disposition of the external areas which are in alignment via their edges and of the resilient contacts 38 and 40 of the reader which are also in alignment, connection between the resilient contacts of the reader and the external contact areas of the card takes place simultaneously for all eight external areas of the electrical contact.

For standard cards complying with ISO standard 7816, this situation does not present any drawback since the connector remains unpowered until the card has been fully inserted. In contrast, with cards that comply with the USB standard, this situation is unacceptable, and in particular it is not acceptable that the electrical power supply voltage for the circuits of the electronics module as applied between external areas 18 and 22 might be applied after information signals are applied to the areas 32 and 34. The standard requires that the element plugged into the USB connector must be capable of being plugged in while the connector is powered. In addition, the standard specifies that power supply and ground must necessarily be connected before all of the other contacts.

SUMMARY OF THE INVENTION

An object of the present invention is to allow versatility of use.

To this end, a card comprising electrical contacts for communicating in accordance with a universal serial bus standard, which card can be inserted in a card reader having complementary electrical contacts, the card having an insertion edge which traverses the complementary electrical contacts when the card is inserted in the card reader in a correct fashion, is characterized in that the card comprises an electrical contact for receiving a power supply voltage which electrical contact is closer to the insertion edge than any electrical contact for communicating data in accordance with the universal serial bus standard.

Let it be assumed that a card in accordance with the invention, is inserted in a standard type card reader as shown in FIG. 2. Such a card has a power supply contact that is closer to the insertion edge than any USB-data contact. Consequently, the power supply contacts of the card come into contact with the complementary power supply contacts of the reader before the USB data contacts of the card come into contact with the complementary USB-data contacts of the reader. The USB standard is thus complied with notwithstanding the use of a standard type card reader which otherwise could have resulted in a malfunctioning. Consequently, the invention allows a standard type card reader to effect USB data communication and, therefore, the invention allows versatility in use.

These and other characteristics and advantages of the invention will appear better on reading the following description of a plurality of embodiments of the invention given as non-limiting examples.

DETAILED DESCRIPTION

Figure 1:
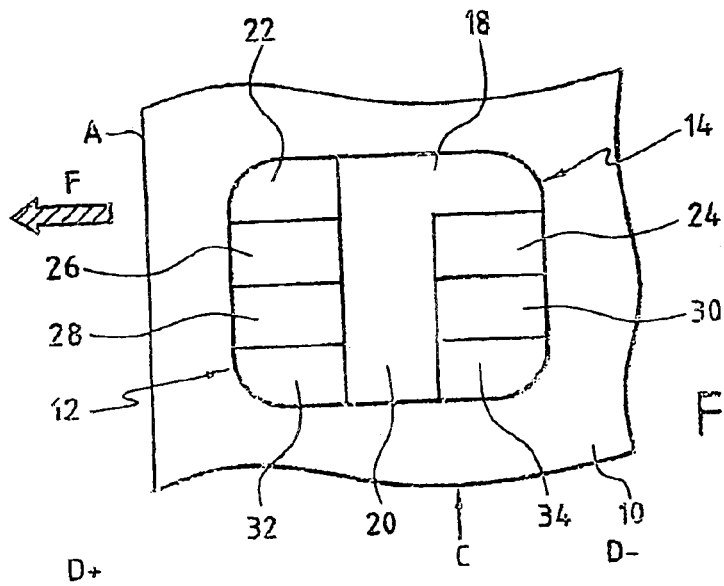
FIG. 1, described above, shows the contact face of a standard electronics module.

The first embodiment of the invention is described with reference initially to FIG. 3. In this figure, there can be seen the card body 10 with its electronics module 12 and its external electrical contact areas referenced 18 to 34. Each external area has the same function as described above with reference to FIG. 1. These areas are disposed in rows D and E which extend perpendicularly to the insertion direction F of the card. For each external area, index a identifies the edge of the area which is closest to the insertion edge A, while index b indicates its edge which is furthest away therefrom. For contact areas 22, 26, and 28, the a and the b edges are all in alignment. In contrast, for the contact 32 corresponding to the D+ input, the a edge referenced 32a is further away from the insertion edge A of the card body than are the other a edges of the areas in the row D. It will thus be understood that while the card C is being inserted into the reader having the connector 16, contact 32 is connected to spring elements 40 and then 38 after contact has been made with the external area 22 for supplying voltage to the electronics module. This ensures that the conditions required by the USB standard are satisfied.

More specifically, it suffices for the metallization forming the contact 32 of FIG. 1 to be provided with a line of etching 50 that marks the boundary between a conductive zone 32' connected to the terminals of the electronics module, and a zone 32" that is left floating.

Figure 4:
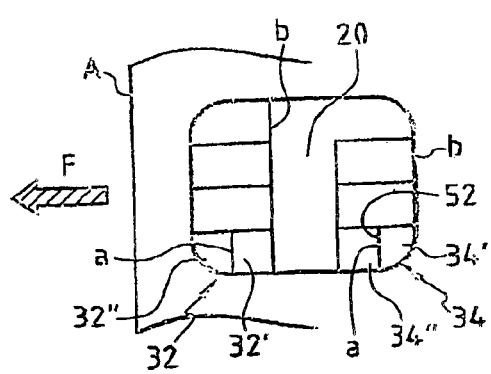
FIG. 4 shows a variant embodiment of the electronics module.

In the embodiment of FIG. 4, the contact areas 32 and 34 both have an a edge offset relative to the insertion edge A of the card C. There are thus two active zones 32' and 34' connected to terminals of the electronics module and two floating zones 32" and 34".

It is important to emphasize that this solution makes it possible to achieve the desired characteristics while requiring no modification to the card reader and requiring very little modification in the manufacture of the electronics module, the modification being restricted to the lines of etching 50 and 52 that mark the boundaries between the contact areas corresponding to floating zones and the zones that are connected to the electronics module.

Figure 3:
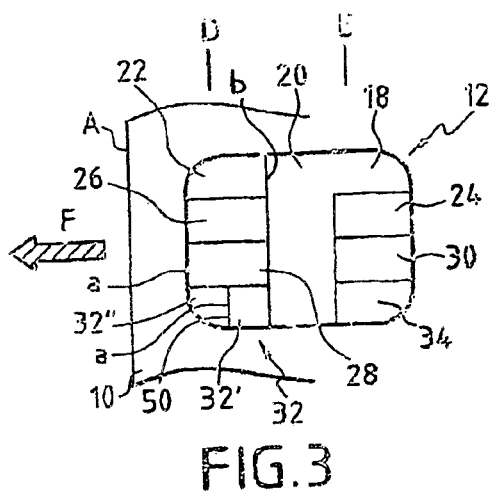
FIG. 3 shows a first embodiment of the contact areas of the electronics module for a card in accordance with the invention.
Figure 5:
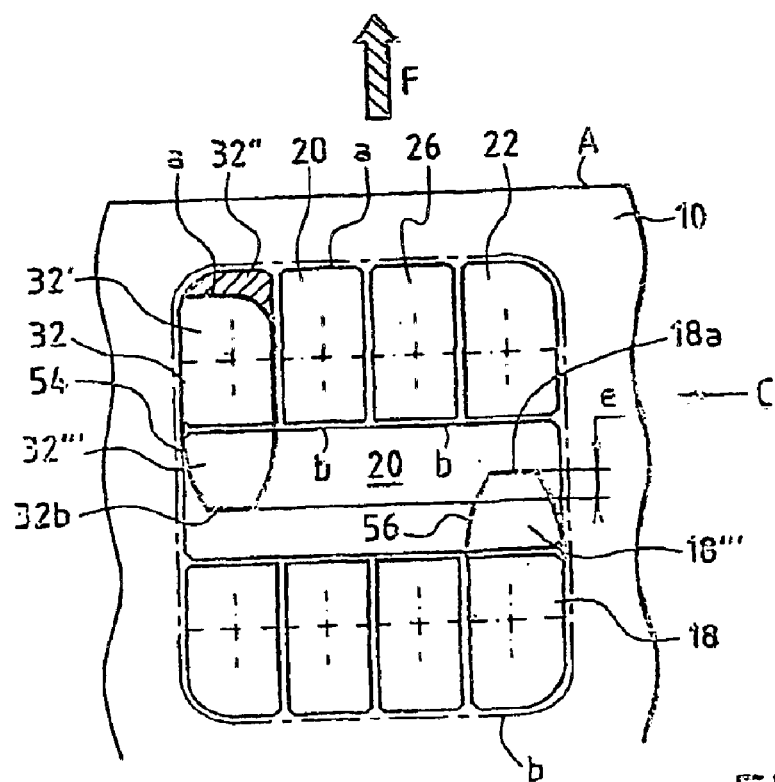
FIG. 5 shows a third embodiment of the external contact areas of an electronic memory card.

The embodiment of FIG. 5 is based on the embodiment of FIG. 3. This figure shows the external contact 32 constituted with its floating zone 32" and its active zone 32'. In this embodiment, additional dispositions are provided to prevent a short circuit occurring between contact springs 38 or 40 of the connector in the card reader during insertion of the card into the reader due to the presence of the intermediate conductive zone 20. To obtain these results, the external area 32 has a second edge b referenced 32b which penetrates into the intermediate zone 20. This extension of the edge b can be obtained by etching 54 formed in the intermediate zone so as to define an extension 32''' of the area 32'. In similar manner, contact area 18 corresponding to ground can have a first edge a, i.e. the edge referenced 18a, which penetrates into the intermediate zone 20, thereby defining an extension 18''' of the area 18 which is defined in this example by etching 56. In addition, relative to the insertion direction F of the card, the second edge 32b is further away from the edge A of the card body than is the first edge 18a of the area 18. Thus, in a direction orthogonal to the insertion direction of the card, overlap e is established between the extensions 32''' and 18''', thus avoiding any risk of a short circuit being established between the spring contacts 38 or 40 of the card reader corresponding to the contact areas 18 and 32.

In the embodiment shown in FIG. 6, the same object is achieved as follows: in the intermediate zone 20, floating zones of metallization 60 and 62 are defined in register with the areas 18 & 22 and 32 & 34, which floating areas are separated from the external ground area 18 by lines of etching 64 and 66. The metallization zones 60 and 62 are not electrically connected to any terminal of the semiconductor chip of the electronics module.

The embodiments described hereinbefore with reference to the drawings illustrate the following first set of basic characteristics. A card comprises electrical contacts (18, 22, 32, 34) for communicating in accordance with a universal serial bus standard. The card can be inserted in a card reader having complementary electrical contacts (16). The card has an insertion edge (A) which traverses the complementary electrical contacts (16) when the card is inserted in the card reader in a correct fashion. The card comprises an electrical contact (22) for receiving a power supply voltage which electrical contact (22) is closer to the insertion edge (A) than any electrical contact for communicating data in accordance with the universal serial bus standard (32, 34). The embodiments described hereinbefore also illustrate the following second set of basic characteristics. A card comprises a first and a second row of electrical contact areas (D, E). The first row (D) comprises a first electrical contact area (32) for communicating data in accordance with a universal serial bus standard. The second row (E) comprises a second electrical contact area (34) for communicating data in accordance with the universal serial bus standard. The intermediate zone between the first and the second electrical contacts (32, 34) is electrically insulated with respect to signal ground. For example, in the FIG. 6 embodiment, the intermediate zone comprises a floating zone of metallization (62). In an alternative embodiment, this zone of metallization (62) may be omitted so that the intermediate zone is constituted by a non-conductive surface.

Figure 2:
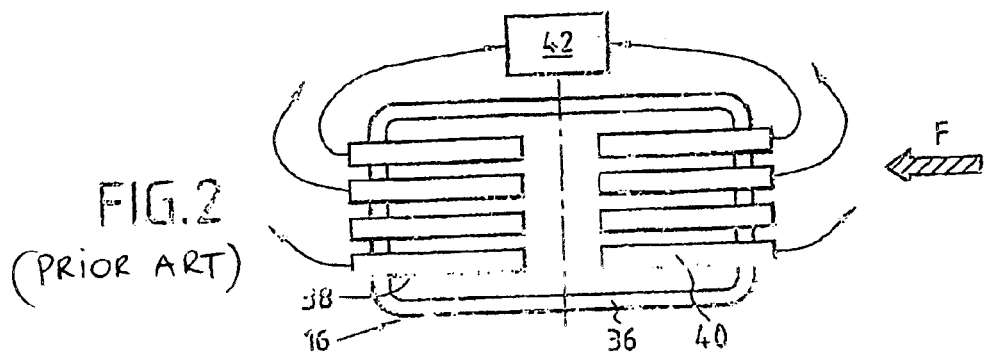
FIG. 2, described above, shows a conventional embodiment of a connector for a device for processing an electronic memory card.
Figure 6:
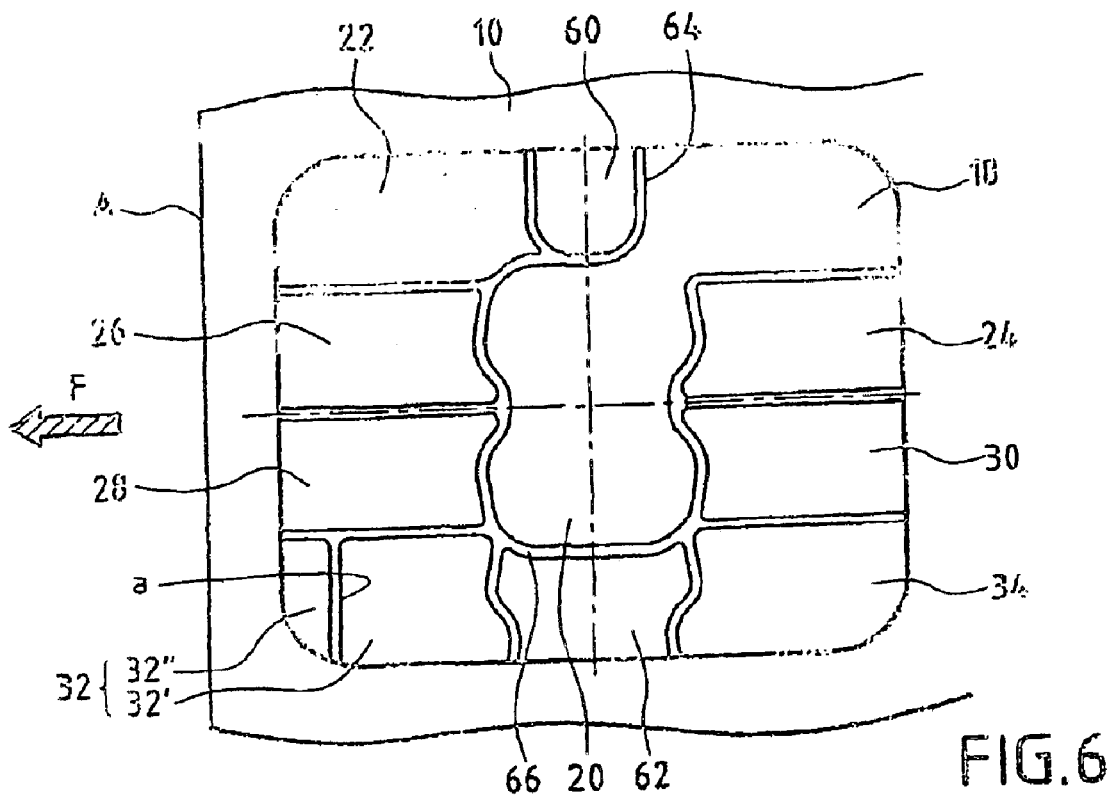
FIG. 6 shows a fourth embodiment of the external areas in accordance with the invention.

Referring to FIGS. 1, 2 and 6, an advantage of the second set of basic characteristics is that the resilient contact springs of the reader corresponding respectively to the external power supply areas of the module and to the external USB type data input areas are prevented from being short-circuited by the continuous intermediate zone of the contact face of the electronics module.

It should be noted that the first and the second set of basic characteristics may be applied independently. That is, one may apply the first set of basic characteristics without applying the second set of basic characteristics and vice versa. However, it is advantageous to apply both sets of basic characteristics.

What is claimed is:

1. A card comprising a pair of electrical contacts for communicating data in the form of a differential signal in accordance with a universal serial bus standard and a power supply electrical contact for receiving a power supply voltage, which card can be inserted in a card reader having complementary electrical contacts for each of the pair of electrical contacts for communicating data in the form of a differential signal and for the power supply electrical contact, the card having an insertion edge which traverses the complementary electrical contacts when the card is inserted in the card reader in a correct fashion, wherein a leading edge of the power supply electrical contact is located more proximal to the insertion edge than leading edges of either electrical contact of the pair of electrical contacts for communicating data in the form of a differential signal in accordance with the universal serial bus standard.

2. A card according to claim 1, wherein the card comprises a further electrical contact for communicating data in accordance with ISO standard 7816.

* * * * *